INVENTORS
MANFRED HEROLD
ADOLF BROSIG

BY Craig & Antonelli
ATTORNEYS

INVENTORS
MANFRED HEROLD
ADOLF BROSIG

BY Craig & Antonelli

ATTORNEYS

United States Patent Office 3,476,218
Patented Nov. 4, 1969

3,476,218
HYDRODYNAMIC BRAKE AND REGULATING MEANS THEREFOR
Manfred Herold and Adolf Brosig, Friedrichshafen, Germany, assignors to Maybach Mercedes-Benz Motorenbau G.m.b.H., Friedrichshafen, Germany
Filed Dec. 15, 1967, Ser. No. 690,867
Claims priority, application Germany, Jan. 7, 1967, M 72,331
Int. Cl. F16d 57/04
U.S. Cl. 188—90      7 Claims

ABSTRACT OF THE DISCLOSURE

A regulating device for a hydrodynamic brake which includes a rotor and a stator into which brake fluid is supplied continuously, in which the braking torque is controlled by removal of fluid from the fluid circuit by means of an outlet so constructed and arranged that the cooperation of the filling pressure and of the pressure of the fluid depending on the brake rotational speed as well as the mutual interaction results in the intended braking torque characteristic as a function of the rotational speed. The particular outlet may be arranged along an annular channel surrounding the hydrodynamic brake and in communication by way of a gap with the brake chamber.

---

Figure 1:
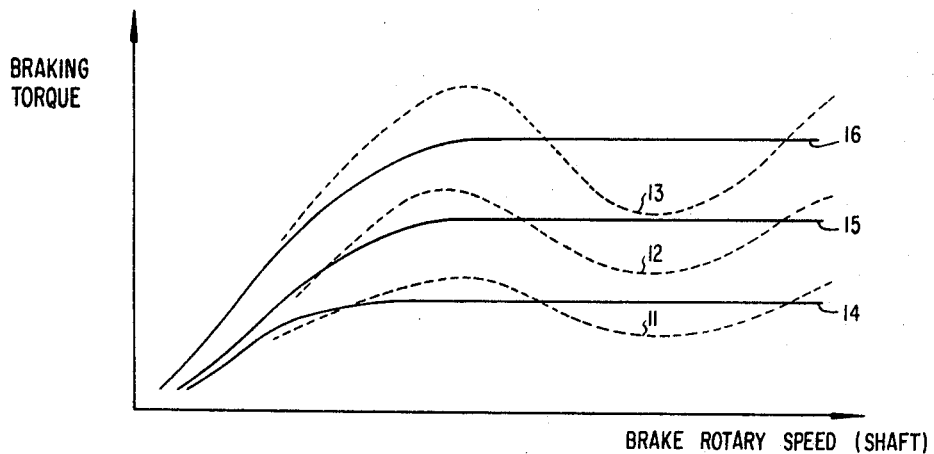

The present invention relates to a hydrodynamic brake and more particularly to a braking torque control for a hydrodynamic brake.

In hydrodynamic brakes the characteristic of the braking torque as a function of the rotational speed depends on the design of the brake and on the type of the employed braking torque control.

By means of the braking torque control, for example, by means of a partial-filling control, of an annular slide control, of a pressure control or of a fluid removing control, a certain amount or magnitude of braking torque can be set corresponding to the associated brake rotational speed; however, if the brake rotational speed changes, then the amount or magnitude of braking torque also changes, in spite of the unchanged position of the braking torque control. In the various positions of the control device, braking torque characteristics as functions of the rotational speed are obtained, which are similar to each other but of different height, i.e., of different magnitude.

However, for most ranges in the use of hydrodynamic brakes these characteristics are not suitable. Depending on the use of the brake, a quite definite characteristic of the braking torque as a function of the rotational speed is desired, e.g. an increasing, constant or decreasing braking torque with increasing rotational speed.

In order to obtain such a predetermined braking torque characteristic, heretofore the braking torque control was re-set continuously. If the braking torque control was supposed to be set or readjusted automatically, a control device which was expensive, sensitive and thereby susceptible to malfunctions was necessary heretofore.

It is an aim and object of this invention to create with simplest possible means an automatic regulating device for a desired braking torque characteristic as a function of the brake rotational speed, and to avoid the disadvantages of the prior art control devices.

According to the present invention, the underlying problem is solved by a regulating device for a hydrodynamic brake, to which brake fluid is supplied continuously and the braking torque of which is controlled by removing fluid from the fluid circuit, by such an arrangement and flow-favorable design of the outlet that the cooperation of the filling pressure and of the pressure depending on the brake rotational speed as well as the mutual influence of these pressures by the fluid removal results in the intended braking torque characteristics as a function of the rotational speed.

Especially simple and effective is the arrangement of the fluid outlet at an annular channel, which surrounds the brake radially outwardly of the gap between rotor and stator.

Accordingly, it is an object of the present invention to provide an automatic regulating device for hydrodynamic brakes which avoids by extremely simple means the aforementioned shortcomings and drawbacks encountered in the prior art.

It is another object of the present invention to provide an automatic regulating device for a desired braking torque characteristics which is simple in construction and does not require expensive parts.

A further object of the present invention resides in an automatic regulating device for hydrodynamic brakes which is not only extremely reliable in operation but offers great versatility in use.

Figure 2:
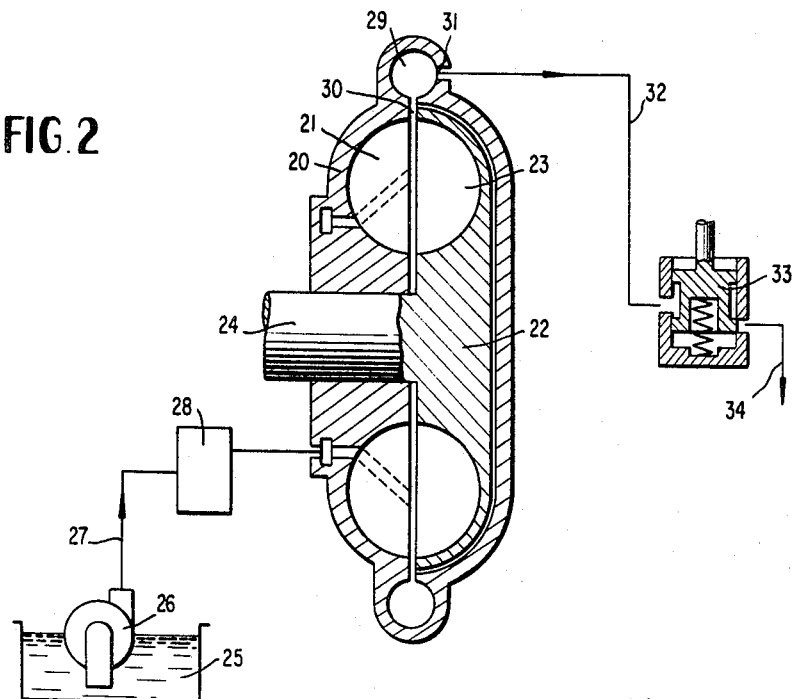

These and other objects, features and advantages of the present invention will become more obvious from the following description when taken in connection with the accompanying drawing which shows, for purposes of illustration only, several embodiments in accordance with the present invention, and wherein:

FIGURE 1 is a diagram of braking torque characteristics of a prior art non-regulated hydrodynamic brake and of a regulated hydrodynamic brake according to the present invention;

FIGURE 2 is a cross-sectional view through a hydrodynamic brake with a control device for fluid removal in accordance with the present invention; and FIGURES 3a and 3b, 4a and 4b, 5a and 5b, and 6a and 6b are partial longitudinal and transverse cross-sectional views, respectively, through four embodiments of the present invention.

Referring now to the drawing wherein like reference numerals are used throughout the various views to designate like parts, and more particularly to FIGURE 1, the diagram illustrated in this figure shows the braking torque characteristics as a function of the brake rotational speed in a non-regulated and in a regulated brake. The dash-line curves 11, 12 and 13 are the braking torque characteristics of a non-regulated brake corresponding to three different positions of the control device. According to these curves the braking torque initially increases with increasing rotational speed, it then decreases at medium rotational speeds and increases again at higher rotational speeds.

In conformity with the position of the control device, the braking torque is of different height or magnitude at the different speeds; however, the braking torque characteristics as functions of the speed range are similar to each other. This characteristic of the curves 11, 12 and 13 are associated with a certain brake design and braking control device. Brakes of a different design may have another braking torque characteristic as a function of the rotational speed, but in most cases the available or selected brake design and braking control device will not by coincidence also have the most favorable braking torque characteristic for a given use or application.

The curves 14, 15 and 16 are braking torque characteristics of a hydrodynamic brake provided with a regulating device in accordance with the present invention which is designed for constant braking torques at various different positions of the control device.

FIGURE 2 shows a hydrodynamic brake consisting of a housing 20 with stator blades 21 and of a rotor 22 with blades 23 which are fixedly mounted or secured to the shaft 24 to be retarded or braked. The brake is supplied with brake fluid from a supply tank 25 by means of a filling pump 26 and by way of a supply or filling line 27 and of filling valve 28. This valve 28 serves only for the engagement or disengaging of the brake but has no control or regulating functions. The brake is surrounded radially outside of the gap between stator and rotor blades 21 and 23 by an annular channel 20 which is connected to the brake chamber by a radial gap 30 over the entire circumference of the housing 29. For controlling the braking torque by means of fluid removal an outlet 31 is arranged on the annular channel. A discharge line 32 leads from the outlet 31 back to the supply tank 25 by way of a fluid removal control slide 33 with adjustable passage of flow section area and a line 34. For purposes of cooling the brake fluid a cooling line leads from the annular channel 29 by way of a heat-exchanger back to the brake chamber. For reasons of simplification, the cooling equipment of conventional construction is not shown in the drawings.

According to the present invention the outlet 31 along the annular channel 29 is designed for particular flow conditions, i.e., is constructed in a particular manner from a hydraulic point of view. Some of the several possibilities of outlet constructions are shown in FIGURES 3a to 6b which represent enlarged portions of the annular channel 29 in the vicinity of the outlet 31.

Figure 3A:
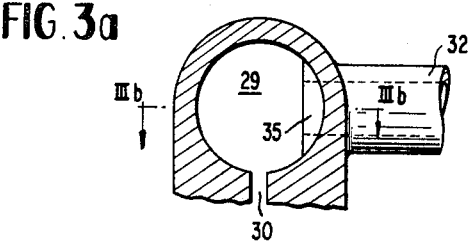
Figure 3B:
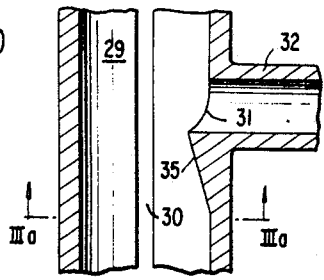

FIGURES 3a and 3b shown an especially preferred embodiment of the present invention. A flow deflection device in the form of an annular channel wall piece 35, inclined to the circumferential direction, is arranged ahead or upstream of the outlet 31 in the direction of rotation of the brake rotor 22. This inclined annular channel wall of the brake rotor 22. This inclined annular channel wall piece 35 can be formed directly from the annular channel wall, or it can be be a flexible baffle plate provided with a set screw for adjusting purposes.

Figure 4A:
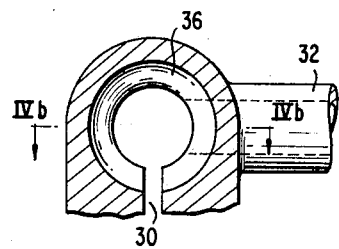
Figure 4B:
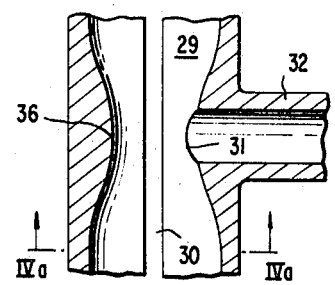

A further embodiment of the present invention is illustrated in FIGURES 4a and 4b, in which the cross section of the annular channel 29 is contracted or constricted in the vicinity of the outlet 31. The cross-sectional contraction or constriction 36 can be shaped nozzle-like, as shown in FIGURES 4a and 4b, but may also be of any other suitable shape.

Two further embodiments of the present invention are illustrated in FIGURES 5a, 5b and 6a, 6b, in which the end of the outlet line 31 branching off from the annular channel 29 consists of cylindrical tubes or pipes and is used for a flow affecting construction of the outlet, in accordance with the present invention.

Figure 5A:
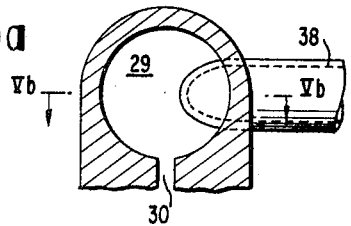
Figure 5B:
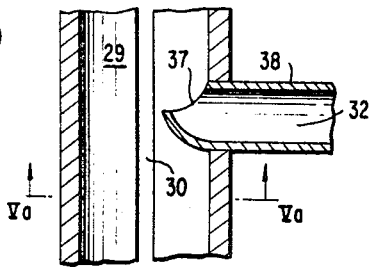

In the embodiment according to FIGURES 5a and 5b the end of the outlet line protrudes into the annular channel 29 and acts as scooping device, whose orifice 37 can be positionally adjusted in the direction of flow, opposite the direction of flow, and into various intermediate positions, by rotating the tube 38.

Figure 6A:
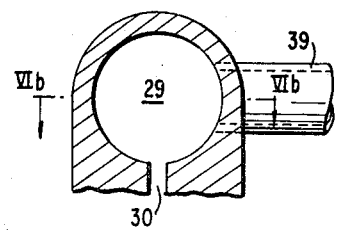
Figure 6B:
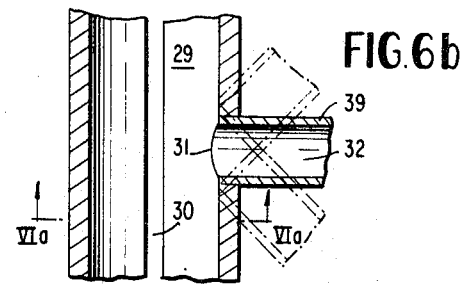

In the embodiment as shown in FIGURES 6a and 6b the tube or pipe 39 of the outlet line is possibly adjustably arranged at the annular channel 29 under an angle to its circumferential direction which corresponds to the desired braking torque characteristic.

The operation of the brake provided with a fluid removal control and with a braking torque regulating device according to the present invention is as follows:

For braking, the valve 28 is opened while the filling pump is operating, whereby the brake chamber is filled with brake fluid from the supply tank 25 by way of the filling line 27. Due to the rotation of the rotor 22 to be braked, a circulation of the brake fluid is created in the annular channel in circumferential direction of the brake, which flow serves primarily for the production of the cooling circuit (not shown). For controlling the brake, brake fluid is removed from the annular channel 29 by way of line 32. By controlling the quantity of removed fluid by means of the slide valve 33, the desired braking torque is adjusted.

The flow velocity in the annular channel 29 depends on the rotational speed of the rotor 22. By the inventive construction of the outlet 31 the static pressure at this place is affected in dependence on the rotational speed of the rotor. As a result thereof, the quantity of fluid to be removed is not only controlled by control slide 33, but is also automatically regulated in dependence on the rotational speed of the rotor. The pressure in the brake chamber and in connection therewith the braking torque depends on the quantity of fluid removed. Most of those braking torque characteristics as a function of the rotational speed which are desired in practice can be obtained by corresponding dimensioning and/or setting of the flow affecting construction of the outlet.

It is possible with lightly loaded brakes having a small heat development to omit the supply tank 25 and the filling pump 26 and to design and construct the outlet of the line leading from the annular channel to the heat-exchanger according to the present invention, and, if necessary, to install the control slide 33 into this line.

While we have shown and described several embodiments in accordance with the present invention, it is understood that the same is not limited thereto but is susceptible of numerous changes and modifications as known to a person skilled in the art.

We claim:

1. In a hydrodynamic brake having a rotor, a stator and fluid circuit means for continuously supplying brake fluid thereto, the braking torque developed thereby being controlled by removal of fluid from the fluid circuit means, wherein said fluid circuit means includes an annular channel surrounding the brake, disposed radially outwardly of a gap formed between said rotor and said stator and a brake fluid outlet means arranged in said annular channel, the improvement comprising flow deflection means extending into said annular channel in the region of said fluid outlet means and varying the normal flow of fluid therefrom, which is otherwise dependent upon brake rotational speed, whereby the braking torque developed remains substantially constant despite substantially constant despite substantial variation in brake rotational speed.

2. A regulating device according to claim 1, wherein said flow deflection means is arranged in the annular channel in advance of the outlet means, as viewed in the direction of flow.

3. A regulating device according to claim 2, wherein said flow deflection means is adjustable.

4. A regulating device according to claim 1, further comprising means for varying the cross section of the annular channel, said outlet means being arranged at such a place of the flow in the annular channel as is affected by said means for varying the cross section.

5. A regulating device according to claim 4, wherein the means for varying the cross section is constructed in a nozzle-like manner.

6. A regulating device according to claim 1, wherein said flow deflection means includes scooping means protruding into the annular channel at the place of the outlet means.

7. A regulating device according to claim 6, wherein said scooping means includes a substantially cylindrical tube arranged rotatably with respect to said annular channel, which tube branches off from said annular channel to form the outlet for said brake fluid.

References Cited

UNITED STATES PATENTS

| | | |
|---|---|---|
| 1,685,735 | 9/1928 | Walker. |
| 2,425,171 | 8/1947 | Bennett et al. |
| 2,786,552 | 3/1957 | De La Mater et al. |
| 3,095,820 | 7/1963 | Sanborn et al. |
| 3,363,728 | 1/1968 | Stengelin et al. |

GEORGE E. A. HALVOSA, Primary Examiner